United States Patent [19]
Tomitaka

[11] Patent Number: 5,424,886
[45] Date of Patent: Jun. 13, 1995

[54] METHOD AND APPARATUS FOR EFFECTING FUZZY CONTROL TRACKING SERVO

[75] Inventor: Tadafusa Tomitaka, Tokyo, Japan

[73] Assignee: Sony Corporation, Tokyo, Japan

[21] Appl. No.: 92,281

[22] Filed: Jul. 15, 1993

Related U.S. Application Data

[63] Continuation of Ser. No. 579,974, Sep. 10, 1990, abandoned.

[30] Foreign Application Priority Data

Sep. 16, 1989 [JP] Japan .................. 1-240399
Sep. 16, 1989 [JP] Japan .................. 1-240400
Sep. 16, 1989 [JP] Japan .................. 1-240401

[51] Int. Cl.$^6$ .................................. G11B 5/58
[52] U.S. Cl. .................... 360/77.01; 360/70; 360/77.13; 395/900
[58] Field of Search ............. 360/77.11, 77.13, 77.17, 360/70; 395/900, 3

[56] References Cited

U.S. PATENT DOCUMENTS

| | | | |
|---|---|---|---|
| 4,837,725 | 6/1989 | Yamakawa | 395/3 |
| 4,875,184 | 10/1989 | Yamakawa | 395/3 |
| 5,339,365 | 8/1994 | Kawai et al. | 382/54 |
| 5,340,309 | 8/1994 | Robertson | 433/69 |

FOREIGN PATENT DOCUMENTS

| | | |
|---|---|---|
| 169479 | 1/1986 | European Pat. Off. |
| 181186 | 5/1986 | European Pat. Off. |
| 0268182 | 5/1988 | European Pat. Off. |
| 292286 | 11/1988 | European Pat. Off. |
| 2004094 | 3/1979 | United Kingdom |

OTHER PUBLICATIONS

Patent Abstracts of Japan vol. 15, No. 192 (P-1202) Apr. 17, 1991; JP-A-03044 815 (Omron Corp.) Feb. 26, 1991.
Patent Abstracts of Japan vol. 15, No. 153 (P-1191), Apr. 17, 1991 & JP-1A-03 023 522 (Omron Corp.) Jan. 31, 1991.
Patent Abstracts of Japan No. 7376 (E-78); & JP-A-53 090 910 (Matsushita) Oct. 8, 1978.
Elektronica (Inc. Databus), vol. 37, Nos. 1/2, Jan. 20, 1989, pp. 34–43, Deventer, NL; J. M. Van Thiel: "Redeneren met vage gegevens".
Patent Abstracts of Japan, vol. 12, No. 363 (P-764), Sep. 29, 1988; & JP-A-63 113 733 (Fuji Electric Co. Ltd) 18 May 1988.
Patent Abstracts of Japan, vol. 12, No. 377 (P-768) Oct. 7, 1988; & JP-A-63 123 177 (Omron Tateisi Electronics Co.) 26 May 1988.
International Journal Man-Machine Studies, vol. 7, 2nd Nov. 1973, pp. 1–13; E. H. Mamdani et al.: "An experiment in linguistic synthesis with fuzzy logic controller".
EDN Electrical Design News, vol. 32, No. 8, 15th Apr., 1987, pp. 201–204, Newton, Ma. US; P. J. Guilamo: "Fuzzy logic allows creation of precise process controllers".
Togai, M. et al., "A Fuzzy Logic Chip and a Fuzzy Inference Accelerator for Real-Time Approximate Reasoning", Proc. 17th Int. Symp. on Multiple Valued Logic, pp. 25–29, May 26–28, 1987, IEEE 1987.

*Primary Examiner*—W. R. Young
*Assistant Examiner*—Varsha A. Kapadia
*Attorney, Agent, or Firm*—William S. Frommer; Alvin Sinderbrand

[57] ABSTRACT

Fuzzy control is disclosed in the environment of tracking control for a playback head relative to a medium from which signals are played back. Tracking control data is generated as a function of the detected signal level of the played back signal by using fuzzy inference to obtain direction and magnitude values of the control data which then is used to adjust the tracking of the head.

20 Claims, 8 Drawing Sheets

| TRACKING CONTROL SIGNAL Cxl(n-1) | | DIFFERENCIATION VALUE ΔE(n) | CONTROL DIRECTION Cxl(n) |
|---|---|---|---|
| PM | 21 | --- | --- |
| PS | 17 | --- | --- |
| ZR | 13 | --- | --- |
| NS | 9 | --- | --- |
| NM | 5 | --- | --- |

↖ Dsub

FIG. 7

|  | Cxl(n-1) | | | | | | |
|---|---|---|---|---|---|---|---|
|  | NL | NM | NS | ZR | PS | PM | PL |
| NL |  |  |  |  |  |  |  |
| NM |  | NM |  |  |  | PM |  |
| NS |  |  | NS |  | PS |  |  |
| ΔE(n) ZR |  |  |  | ZR |  |  |  |
| PS |  |  | PS |  | NS |  |  |
| PM |  | PM |  |  |  | NM |  |
| PL |  |  |  |  |  |  |  |

FIG. 8

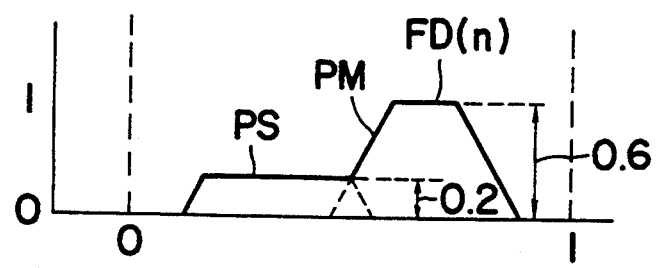
F I G. 9
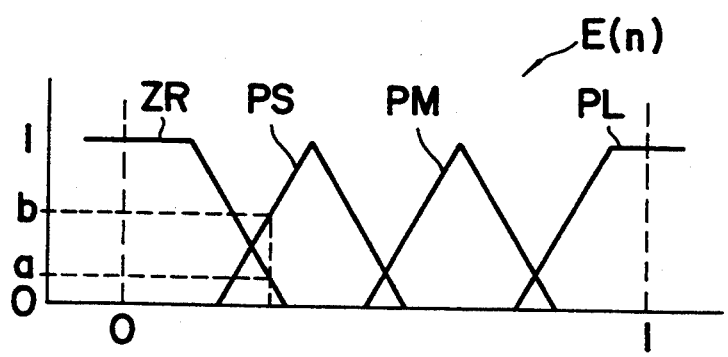
F I G. 10
F I G. 11

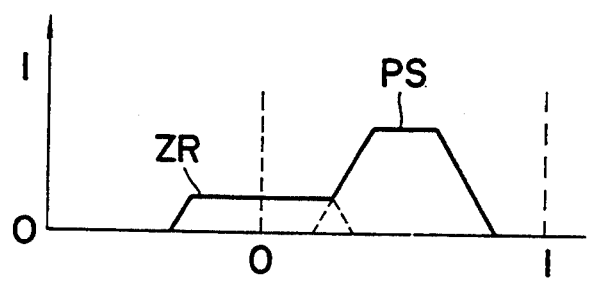
F I G. 15
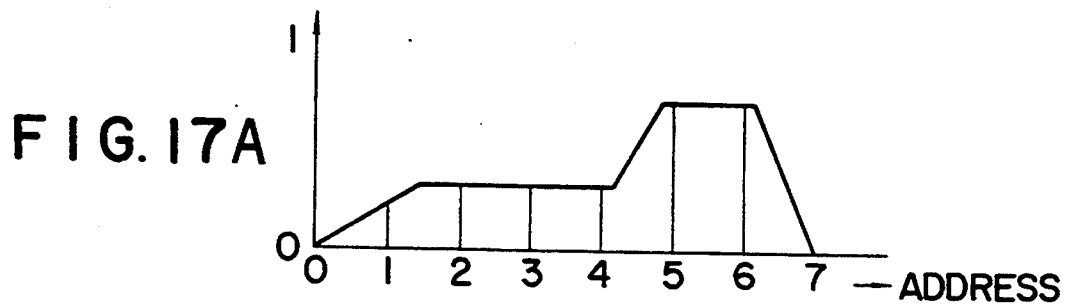
F I G. 17A
F I G. 17B | 0 | 0.2 | 0.3 | 0.3 | 0.3 | 0.7 | 0.7 | 0 |
F I G. 17C | 0 | 0.2 | 0.5 | 0.8 | 1.1 | 1.8 | 2.5 | 2.5 |

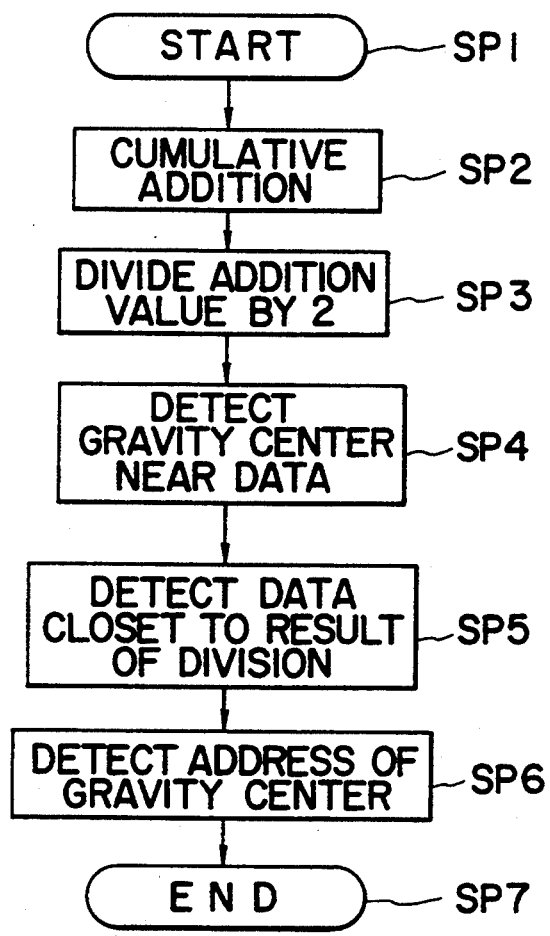
F I G. 16

METHOD AND APPARATUS FOR EFFECTING FUZZY CONTROL TRACKING SERVO

This application is a continuation, of application Ser. No. 07/579,974, filed Sep. 10, 1990, now abandoned.

BACKGROUND OF THE INVENTION

1. Field of the Invention

This invention relates to a tracking control arrangement and, more particularly, to the use of fuzzy inference, or fuzzy reasoning, to achieve highly accurate tracking control.

2. Description of the Prior Art

Tracking control commonly is used when reproducing previously recorded signals from a record medium wherein the medium or the playback transducers (or heads) or both are movable. For example, automatic track finding (ATF) is used conventionally in many video tape recorders to make certain that the playback heads accurately trace the tracks in which video signals have been recorded. ATF control is attained by recording pilot signals whose frequency alternates between reference frequencies from track to track, whereby the relative magnitudes of these pilot signals picked up during a playback operation are compared to provide an indication of a tracking error. The deviation of the head from the track being scanned is related to the magnitude of the pilot signal picked up from an adjacent track and, of course, the track from which a pilot signal is picked up is readily discriminated by the pilot signal frequency. While ATF control is advantageous because it achieves automatic tracking adjustments without the need for user intervention, a typical ATF control circuit is relatively complicated and expensive.

An alternative to ATF control relies upon the signal level, such as an integrated value, the envelope or the long term average level, of the reproduced signal as an indication of a tracking error. As described in, for example, Japanese Patent Application No. 245507/1988, the transport speed of the magnetic video tape is controlled in a manner which maintains this signal level above a predetermined threshold. For example, as shown in FIG. 1 herein, the signal level of the reproduced signal is a maximum $E_{MAX}$ when the playback head is disposed at the center of the track in which the signal is recorded; but the level of the reproduced signal $E(n)$ decreases as the head deviates from the track center. Tracking control is achieved automatically by accelerating or decelerating the magnetic tape in response to the detected signal level $E(n)$ which, as shown, is related to the tracking error. The deviation of the signal level $E(n)$ from the maximum signal level $E_{MAX}$ is obtained simply by comparing the level of the reproduced signal $E(n)$ to the preset maximum level $E_{MAX}$. The resultant error signal $K[E_{MAX}-E(n)]$ is fed back to the tape transport mechanism as a tracking control signal to correct for detected tracking errors.

While the foregoing tracking control arrangement is relatively simple and achieves tracking correction automatically, various disadvantages arise with respect thereto. For example, the actual maximum signal level $E_{MAX}$ which can be reproduced from a particular record medium may be substantially less than the preset value $E_{MAX}$. This frequently occurs when signals are recorded on a magnetic tape by one video recorder and reproduced by another having different characteristics. When the actual maximum signal level is less than the preset level $E_{MAX}$, a proper tracking condition will not be detected because the error signal $K[E_{MAX}-E(n)]$ will not be reduced to zero even when there is no tracking error. Consequently, in an attempt to achieve tracking correction, oscillations may be generated.

Another disadvantage is attributed to the assumption in the tracking control arrangement that the error signal $K[E_{MAX}-E(n)]$ is linear. However, as is appreciated from FIG. 1, changes in the signal level $E(n)$ reproduced from the magnetic tape vary in a non-linear manner with tracking errors. Consequently, and because of this non-linearity, the sensitivity of the tracking control arrangement may increase for large tracking errors but may decrease for small tracking errors. As a result, both transient and steady state response characteristics of this tracking control arrangement may be deficient.

OBJECTS AND SUMMARY OF THE INVENTION

Therefore, it is an object of the present invention to provide a tracking control arrangement which avoids the aforenoted defects and disadvantages, is relatively simple, operates with high accuracy and is relatively inexpensive to implement.

Another object of this invention is to utilize fuzzy inference, or fuzzy reasoning, for tracking control.

A further object of this invention is to provide an improved technique for representing membership functions used in fuzzy reasoning such that the circuit implementations, and particularly the memory devices needed to store such membership functions, are relatively simple and inexpensive.

An additional object of this invention is to provide an improved technique for representing membership functions with relatively low resolution (i.e. the membership functions may be represented by a relatively small number of quantized values) for use with fuzzy reasoning.

Various other objects, advantages and features of the present invention will become readily apparent from the ensuing detailed description, and the novel features will be particularly pointed out in the appended claims.

In accordance with this invention, the tracking of a playback head relative to a medium from which signals are played back is controlled by detecting the signal level of the played back signal, generating tracking control data as a function of the detected signal level by using fuzzy inference; and adjusting the tracking of the head in response to that tracking control data.

In one embodiment, tracking control data is generated, in part, by providing a first set of membership functions representing the detected signal level, and a second set of membership functions representing previous tracking adjustments. Changes which are detected in the playback signal level are used to determine the particular membership function selected from the first set and the value of the preceding tracking adjustment is used to determine the particular membership function selected from the second set. Tracking control is inferred from the membership functions which are selected from the first and second sets. As one example, tracking adjustment is made by accelerating or decelerating the record medium from which signals are reproduced; and a previous tracking adjustment corresponds to a previous amount of acceleration or deceleration.

As a feature of this embodiment, a third set of membership functions representing the detected signal level is provided; and a membership function is selected from this third set in response to the detected level of the reproduced signal. Specific reasoning rules are used to infer the magnitude and direction of tracking control in response to the membership functions selected from this third set and from the aforementioned inferred tracking control.

As yet another feature, the center of gravity of the membership functions which are inferred from the reasoning rules is determined and used as an adjustment signal.

As an aspect of the present invention, a set of membership functions is represented by identifying data common to plural membership functions in the set, the identifying data representing a characteristic relationship between a variable (the variable is, for example, a change in the detected signal level or a previous tracking adjustment or the detected level of the reproduced signal) and the degree to which the variable satisfies a particular range. In addition, each membership function in the set is further represented by position data which locates the respective position of each membership function in that set. In a graphical analysis of the membership functions, the position data represents coordinates along an abscissa at which the respective membership functions in the set begin.

BRIEF DESCRIPTION OF THE DRAWINGS

The following detailed description, given by way of example, will best be understood in conjunction with the accompanying drawings in which:

FIG. 7 represents position data for locating the respective membership functions illustrated in, for example, FIG. 4;

FIG. 8 represents a table illustrating the resultant tracking control direction derived by fuzzy inference in accordance with the present invention;

FIG. 9 is a graphical representation of the results of the fuzzy inference in accordance with one example of the operation of the present invention;

FIG. 10 illustrates a table representing the magnitude of tracking control derived by fuzzy inference in accordance with the present invention;

FIG. 11 is a graphical representation of a set of membership functions for the level of the reproduced signal;

FIG. 15 is a graphical representation of the membership function for tracking control derived by fuzzy inference;

FIG. 16 is a flow chart representing the manner in which a control signal is produced from the tracking control membership function derived by fuzzy inference; and FIGS. 17A–17C are useful in understanding the manner in which the flow chart of FIG. 16 operates.

DETAILED DESCRIPTION OF CERTAIN PREFERRED EMBODIMENTS

Figure 2:
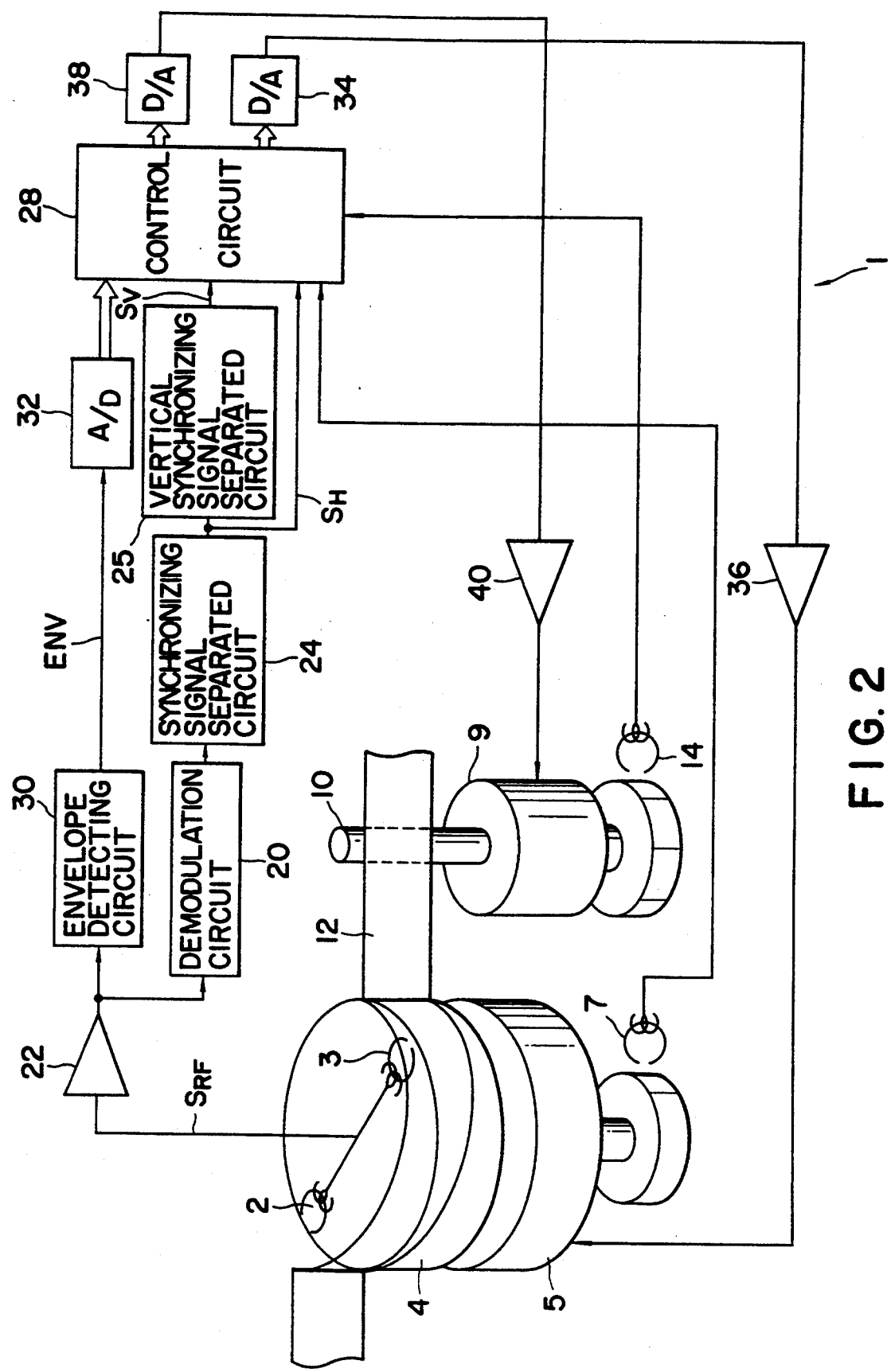
FIG. 2 is a block diagram of one embodiment of an application of the present invention to a tracking control arrangement for a video tape recorder.

Turning now to FIG. 2, there is illustrated a block diagram of a video tape recorder (VTR) in which the tracking control arrangement of the present invention finds ready application. The VTR is provided with a pair of oppositely spaced apart record/playback heads 2 and 3 mounted on a rotary drum 4 driven by a drum motor 5. The heads rotate so as to scan slant tracks across a magnetic tape 12 deployed about drum 4 and transported by a capstan 10 that is driven by a capstan motor 9. For convenience and simplification, it is assumed that two tracks are scanned across tape 12 for each rotation of drum 4. That is, for proper operation, tape 12 is advanced by an amount substantially equal to two track pitches for each full rotation of the drum.

Drum speed is detected by a frequency generator 7 which, typically, is comprised of a stationary head that picks up signals produced by magnetic elements that rotate with drum motor 5, thereby producing a signal whose frequency represents the drum speed. Similarly, the speed of capstan motor 9 is represented by a frequency generator 14 which may be of similar construction and which also produces a signal whose frequency is a direct measurement of capstan speed and, thus, of tape speed. The drum speed and tape speed signals are supplied to a control circuit 28, to be described.

When heads 2 and 3 are used to reproduce previously recorded signals from tape 12, the reproduced signal $S_{RF}$ is supplied by way of an amplifier 22 to a demodulating circuit 20 and also to an envelope detector 30. The demodulating circuit functions to demodulate the reproduced signal $S_{RF}$, such as a video signal, and the demodulated signal is supplied to a synchronizing signal separator 24. This separator serves to separate the usual horizontal synchronizing signal $S_H$ from the demodulated video signal; and the horizontal synchronizing signal is supplied to control circuit 28. In addition, vertical synchronizing signal separator 25 coupled to separator 24 serves to separate the vertical synchronizing signal $S_V$ from the demodulated video signal; and the separated vertical synchronizing signal $S_V$ also is supplied to control circuit 28. The separated horizontal and vertical synchronizing signals are used by the control circuit for proper timing control, which forms no part of the present invention per se.

Figure 1:
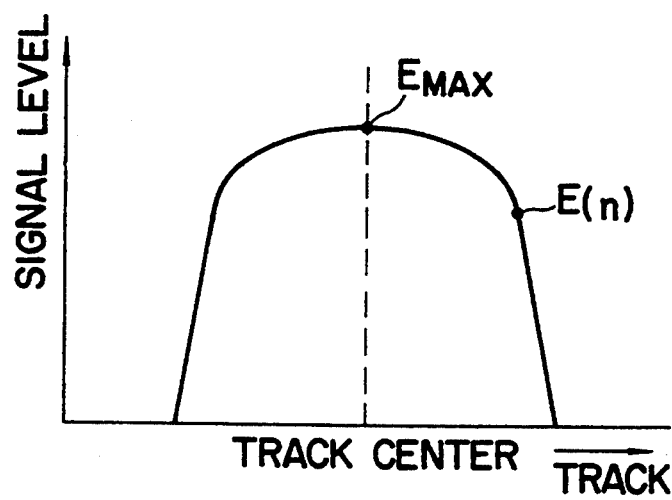
FIG. 1 is a graphical representation of the relationship between tracking error and reproduced signal level.
Figure 3:
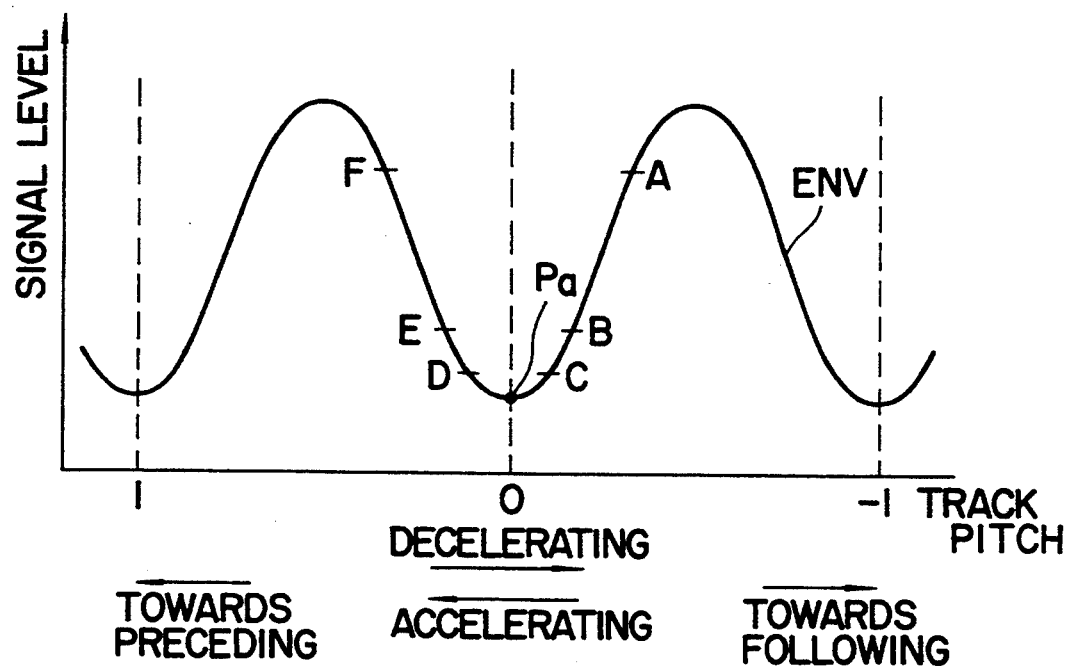
FIG. 3 is a graphical representation of the relationship between the envelope level of a reproduced signal and the tracking error of the head used to play back that signal.

Envelope detector 30 operates to detect the envelope ENV of the signal $S_{RF}$ reproduced from tape 12. More particularly, it will be appreciated that the envelope of the reproduced signal varies as shown in FIG. 3 as a function of the tracking of heads 2 and 3 relative to the previously recorded tracks on tape 12. The envelope detector serves to detect the lower envelope of the reproduced signal $S_{RF}$; and the level of the envelope ENV is at a minimum when the heads are in proper alignment with the tracks being scanned thereby, and is at a maximum when the heads experience maximum tracking error. The detected envelope level of the reproduced signal is digitized by an analog-to-digital (A/D) converter 32 and supplied to control circuit 28.

The control circuit functions to maintain drum motor 5 and capstan motor 9 at their proper predetermined speeds. In addition, the control circuit responds to the level of the detected envelope ENV to produce a tracking control signal which is supplied by way of a digital-to-analog (D/A) converter 38 and amplifier 40 to capstan motor 9. The control circuit utilizes fuzzy inference, described below, to attain this tracking control operation.

The speed of drum motor 5 is measured by control circuit 28 by counting the number of reference clock pulses that are generated during one period of the drum speed signal produced by frequency generator 7. If the measured drum speed differs from a desired speed, a suitable control signal is produced by the control circuit and fed back to drum motor 5 by way of D/A converter 34 and amplifier 36. Similarly, tape speed is measured by the control circuit by counting the number of reference clock pulses that are generated during one period of the tape speed signal produced by frequency generator 14. Here too, if the measured tape speed differs from a desired tape speed, a suitable speed control signal is produced by the control circuit and fed back to capstan motor 9 by D/A converter 38 and amplifier 40. As will be described, the control circuit also produces an accelerating/decelerating signal which is supplied to the capstan motor as a tracking adjustment signal.

The manner in which the tracking adjustment signal (also referred to herein as tracking control data) is produced now will be described.

FIG. 3 illustrates the envelope of the playback signal detected by envelope detector 30. It is appreciated that the level of the detected envelope ENV is a minimum when heads 2 and 3 are in proper tracking relation with the tracks on tape 12. As the heads are displaced from this position, the level of the detected enveloped ENV increases. As represented by FIG. 3, if the heads are effectively displaced toward a preceding record track, proper tracking relation is restored by decelerating capstan motor 9 which reduces the tape speed. Conversely, if the heads are effectively displaced toward the following track, the proper tracking relationship is restored by accelerating the capstan motor and thus increasing the tape speed.

FIG. 3 also illustrates that if capstan motor 9 is in the process of being decelerated and if the level of the detected envelope ENV is decreasing, a tracking adjustment is being made so as to return the heads to their proper tracking relation. If, however, the level of the detected envelope ENV is increasing while the capstan motor is being decelerated, the heads are being displaced farther from the desired track and the tracking error will increase. Likewise, if the capstan motor is being accelerated and if the level of the detected envelope ENV is decreasing, the heads are being returned to proper tracking relation. However, if the level of the detected envelope ENV is increasing while the capstan motor is being accelerated, the heads are being further displaced and the tracking error will increase.

In view of the foregoing, the direction in which a tracking adjustment is to be made may be determined by detecting the acceleration or deceleration of capstan motor 9 and by detecting changes in the level of the envelope ENV. The present invention proceeds by using fuzzy inference to determine the direction and magnitude of the tracking adjustment which is needed.

Let it be assumed that the tracking control data determined by control circuit 28 during the nth time interval, or sample, is represented as CX1(n). Accordingly, the previous tracking control data produced by the control circuit during the (n−1)-th time interval is represented as CX1(n−1). The polarity of this tracking control data CX1(n−1) represents acceleration or deceleration, and the magnitude, or value, thereof represents the amount of tracking adjustment that had been applied, such as the amount of acceleration or deceleration imparted to the capstan motor. As will be described, control circuit 28 generates tracking control data CX1(n) in response to the preceding tracking control data CX1(n−1) together with other conditions in accordance with specific reasoning rules, as will be described. Included in these other conditions is a change in the level of the detected envelope ENV from one time interval, or sampling time, to the next. This change in the level of the envelope is referred to herein as a difference value ΔE(n).

The specific reasoning rules under which control circuit 28 operates to infer the tracking control direction are as follows:

Rule HK1: If the capstan motor 9 is in the process of being accelerated, that is, if the preceding tracking control data is positive (CX1(n−1)>0), and if the level of the detected envelope ENV is increasing (ΔE(n)>0), then the capstan motor should be decelerated (CX1(n)<0) to return the heads to their proper tracking position.

Rule HK2: If the capstan motor 9 is in the process of being decelerated, (CX1(n−1)<0), and if the level of the detected envelope ENV is increasing (ΔE(n)>0), then the capstan motor should be accelerated (CX1(n)>0) to return the heads to their proper tracking position.

Rule HK3: If the capstan motor is in the process of being accelerated (CX1(n−1)>0), and the level of the detected envelope ENV is decreasing (ΔE(n)<0), then the capstan motor should continue to be accelerated (CX1(n)>0).

Rule HK4: If the capstan motor is in the process of being decelerated (CX1(n−1)<0), and the level of the detected envelope ENV is decreasing (ΔE(n)<0), then the capstan motor should continue to be decelerated (CX1(n)<0).

It is appreciated that the foregoing rules do not fully consider the magnitude of acceleration or deceleration or the magnitude of the change in the level of the detected envelope ΔE. Accordingly, in the preferred embodiment, rules HK1 through HK4 are extended to be more explicit to satisfy the following:

When: (a) the magnitude of the acceleration applied to the capstan motor, as represented by the tracking control data CX1(n−1), is of an intermediate level, the range of acceleration may be represented as PM (referred to as "positive medium" acceleration), and (b) the magnitude of the change in the level of the envelope ENV, represented by ΔE(n), is of an intermediate level in the negative direction (a "negative medium" range NM), then the heads exhibit a tracking error in the region AB shown in FIG. 3. Consequently, to correct this tracking error, a tracking adjustment should be made of intermediate magnitude in the positive direction, represented as PM. This is represented as Rule H1:

$$CX1(n-1)=PM \text{ AND } \Delta E(n)=NM \rightarrow CX1(n)=PM.$$

When the magnitude of acceleration represented by the tracking control data CX1(n−1) is of an intermediate level in the positive direction, represented by PM, and the change in the detected envelope ΔE(n) also is of an intermediate level in the positive direction, then the heads exhibit a tracking error in the region EF shown in FIG. 3. Consequently, to correct this error, a tracking adjustment should be made of intermediate magnitude in the negative direction, represented as NM. This is represented as Rule H2:

$$CX1(n-1)=PM \text{ AND } \Delta E(n)=PM \rightarrow CX1(n)=NM$$

When the magnitude of acceleration CX1(n−1) is of a small level in the positive direction, represented as PS, and the magnitude of the change in the detected envelope ΔE(n) is of a small magnitude in the negative direction, represented as NS, then the heads exhibit a tracking error in the region BC shown in FIG. 3. Consequently, to correct this error, a tracking adjustment should be made of a small magnitude in the positive direction, referred to as PS. This is represented as Rule H3:

$$CX1(n-1)=PS \text{ AND } \Delta E(n)=NS \rightarrow CX1(n)=PS$$

When the magnitude of acceleration CX1(n−1) is of a small level in the positive direction (PS), and the magnitude of the change in the detected envelope ΔE(n) is of a small level in the positive direction (PS), then heads exhibit a tracking error in the region DE, shown in FIG. 3. To correct this error, a tracking adjustment should be made of small magnitude in the negative direction, referred to as NS. This is represented as Rule H4:

$$CX1(n-1)=PS \text{ AND } \Delta E(n)=PS \rightarrow CX1(n)=NS$$

When the magnitude of acceleration CX1(n−1) is substantially zero, referred to as ZR, and the magnitude of the change in the detected envelope ΔE(n) is also substantially zero, then the heads exhibit a tracking error in the region CD, shown in FIG. 3. It is appreciated that this tracking error likewise is substantially zero and little, if any, tracking adjustment need be made. This tracking adjustment is referred to as ZR, and the foregoing is represented as Rule H5:

$$CX1(n-1)=ZR \text{ AND } \Delta E(n)=ZR \rightarrow CX1(n)=ZR$$

When the magnitude of acceleration CX1(n−1) is of a small level in the negative direction (NS), and the magnitude of the change in the detected envelope ΔE(n) likewise is of a small level in the negative direction, then the heads exhibit a tracking error in the region ED, shown in FIG. 3. To correct this error, a tracking adjustment should be made of small magnitude in the negative direction, referred to as NS. This is represented as Rule H6:

$$CX1(n-1)=NS \text{ AND } \Delta E(n)=NS \rightarrow CX1(n)=NS$$

When the magnitude of acceleration CX1(n−1) is of a small level in the negative direction (NS), and the magnitude of the change in the detected envelope ΔE(n) is of a small level in the positive direction (PS), then the heads exhibit a tracking error in the region CB, shown in FIG. 3. Consequently, to correct this error, a tracking adjustment should be made of small magnitude in the positive direction, referred to as PS. This is represented as Rule H7:

$$CX1(n-1)=NS \text{ AND } \Delta E(n)=PS \rightarrow CX1(n)=PS$$

When the magnitude of acceleration CX1(n−1) is of an intermediate level in the negative direction (NM), and the magnitude of the change in the detected envelope ΔE(n) likewise is of an intermediate level in the negative direction, then the heads exhibit a tracking error in the region FE, shown in FIG. 3. To correct this error, a tracking adjustment should be made of intermediate magnitude in the negative direction, referred to as NM. This is represented as Rule H8:

$$CX1(n-1)=NM \text{ AND } \Delta E(n)=NM \rightarrow CX1(n)=NM$$

Finally, when the magnitude of acceleration CX1(n−1) is of an intermediate level in the negative direction (NM), and the magnitude of the change in the detected envelope ΔE(n) is of an intermediate level in the positive direction (PM), then the heads exhibit a tracking error in the region BA, shown in FIG. 3. Consequently, to correct this error, a tracking adjustment should be made of intermediate magnitude in the positive direction, referred to as PM. This is represented as Rule H9:

$$CX1(n-1)=NM \text{ AND } \Delta E(n)=PM \rightarrow CX1(n)=PM$$

In adopting these reasoning Rules H1–H9, it is assumed that capstan motor 9 advances tape 12 by an amount equal to two track pitches during each full rotation of heads 2,3. Should this relation not apply, such as when tape 12 is recorded on a video tape recorder which differs from the video tape recorder used for reproduction and thus exhibits different drum speeds and/or capstan speeds, tracking errors will be detected resulting in erroneously inferred tracking adjustments. That is, during a playback operation, the capstan motor may be erroneously accelerated or decelerated in an attempt to correct tracking errors which are, in actuality, speed errors caused by different drum or capstan speeds. In this regard, control circuit 28 additionally functions to integrate the tracking control data CX1(n−1); and the resultant integrated value is used to compensate the capstan speed control signal normally supplied to capstan motor 9 as a function of detected capstan speed errors. It will be appreciated that such speed errors are separate and distinct from tracking errors.

Consistent with the reasoning Rules H1–H9, acceleration or deceleration of the capstan motor, that is, positive or negative tracking adjustments, are made as a function of whether the tracking control data CX1(n−1) increases or decreases. It may be thought, however, that control over the capstan motor for tracking error correction may be effected in accordance with the following equation:

$$R = \sum_{i=0}^{n} A_i CX1(i) + \sum_{i=0}^{n} B_i CX2(i) + C_{Im}(n) \qquad (1)$$

where $A_i$, $B_i$ and C are coefficients, CX1(i) is the tracking control data at the i-th time interval, or sample, CX2(i) is the error signal at the i-th time interval or sample that is the difference between the actual and desired capstan speed and Im(n) is the motor current through the capstan motor which varies with the torque of that motor. When equation (1) is applied to reasoning Rules H1–H9, $A_i = A_{(n-1)} = 1$ and $B_i = C = 0$.

While an implementation of equation (1) possibly may result in inferred tracking control data with higher accuracy, such increase in accuracy is more than offset by the complexity of the control circuit needed to carry out the arithmetic operations of this equation (1). It has been found that, as a practical matter, the accuracy achieved in inferring tracking control from reasoning Rules H1–H9 is sufficiently high and, moreover, the control circuit may be implemented, both in hardware and in software, in an overall arrangement which is substantially simplified.

The manner in which control circuit 28 executes the reasoning Rules H1–H9 now will be described. One of ordinary skill in the art will appreciate that control circuit 28 includes a commercially available microprocessor (the particular manufacturer and model form no part of the present invention per se) and, additionally, may include fuzzy logic circuits of the type described in U.S. Pat. Nos. 4,694,418 and 4,837,725. The microprocessor is programmed to carry out the aforementioned reasoning rules (as well as additional reasoning rules described below) and fuzzy logic implementations, such as described in U.S. Pat. Nos. 4,760,896 and 4,864,490.

Figure 4:
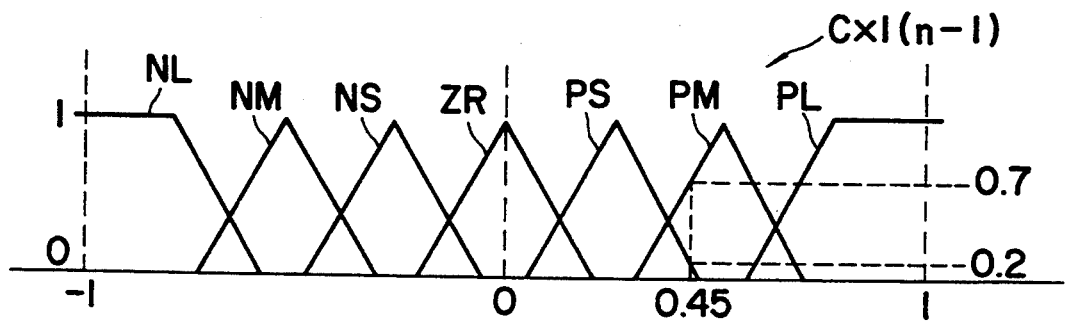
FIGS. 4 and 5 are graphical representations of membership functions for tracking control data and for signal level changes, and are useful in understanding the present invention.

Referring now to FIG. 4, there is graphically illustrated a set of membership functions which represent the degree to which the tracking control data $CX1(n-1)$ satisfies predetermined ranges. Seven membership functions are illustrated as follows:

PL = positive large
PM = positive medium
PS = positive small
ZR = substantially zero
NS = negative small
NM = negative medium
NL = negative large The abscissa shown in FIG. 4 represents a normalized variable, in this case $CX1(n-1)$. The normalized value 0 corresponds to precise tracking alignment of a head with respect to a data track, the normalized value $+1$ represents a tracking error corresponding to one full positive pitch width and the normalized value $-1$ represents a tracking error corresponding to one full negative pitch width. The ordinate represents the degree to which the normalized variable satisfies the indicated range; and in the illustrated embodiment, the membership functions PM, PS, ZR, NS and NM are substantially triangular in shape. As used herein, the "value" of a membership function means the degree to which the variable satisfies a respective range. The set of membership functions corresponding to tracking control data $CX1(n-1)$ may be stored in a memory, such as a ROM, by quantizing each membership function such that each quantized sample is stored as a digital representation of the sample value and the abscissa location (or coordinate) of that sample.

Figure 5:
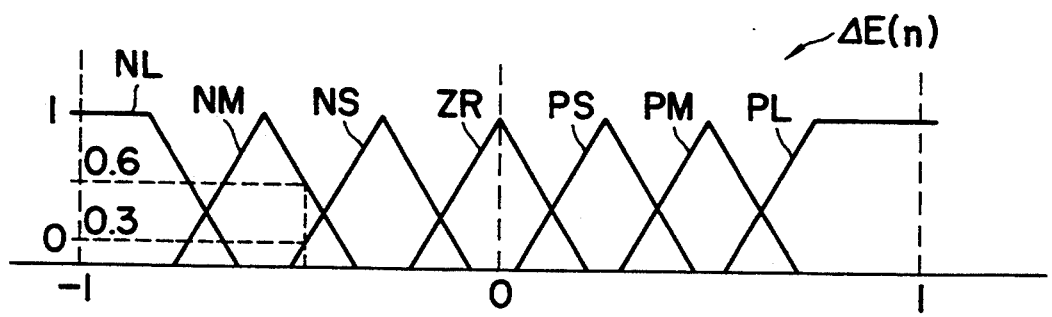

Similarly, the expected values of changes in the detected envelope $\Delta E(n)$ may be represented as the set of membership functions shown graphically in FIG. 5. Here too, the set is comprised of membership functions PL, PM, PS, ZR, NS, NM and NL, respectively. After normalization of the variable $\Delta E(n)$ it is appreciated that each membership function included in the set illustrated in FIG. 5 is substantially similar to the membership functions illustrated in FIG. 4. The set of membership functions for envelope changes $\Delta E(n)$ may be digitized and stored in a memory, such as the same memory used to store the membership functions for tracking control data $CX1(n-1)$.

Preferably, to represent a set of membership functions, the abscissa extending from $-1$ to $+1$ is divided into thirty-two samples. Each membership functions in a set thus may be stored as a subset of these thirty-two samples. For example, since reasoning Rules H1–H9 utilize membership functions PM, PS, ZR, NS and NM for tracking control data $CX1(n-1)$, that is, the membership functions PL and NL are not used by these reasoning rules, then the set of membership functions for $CX1(n-1)$ may be represented as $5 \times 32 = 160$ samples. Likewise, if each membership function included in the set for envelope changes $\Delta E(n)$ is quantized into thirty-two samples, then, since only five membership functions for $\Delta E(n)$ are used in reasoning Rules H1–H9 (membership functions PL and NL are not used), 160 samples must be stored. The set of membership functions for tracking control data $CX1(n)$ inferred by reasoning Rules H1–H9 likewise may be stored as 160 samples.

Figure 6:
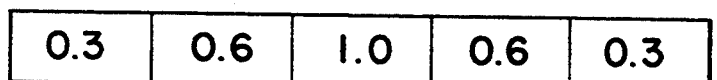
FIG. 6 represents common identifying data used to represent a membership function shown in FIG. 4 or FIG. 5.

It is appreciated that, when the abscissa of FIGS. 4 and 5 is divided into thirty-two samples, the triangular characteristic may be represented with relatively low resolution by five samples. FIG. 6 illustrates these five samples and is referred to as membership function data $D_{BASE}$. This membership function data represents the characteristic relationship (e.g. triangular) between the variable (such as $CX1(n-1)$ or $\Delta E(n)$ or $CX1(n)$) and its degree of satisfaction in the particular range (such as the range PM, PS, ZR, NS or NM). The remaining twenty-seven samples for each membership function are essentially zero. It is recognized that such zero-value samples are redundant and, if stored, unnecessarily occupy useful memory space. It is a feature of the present invention to minimize the memory requirements for storing the sets of membership functions.

Since the membership function data $D_{BASE}$ shown in FIG. 6 is substantially the same for each membership function in each set, this membership function data may be stored as common data $D_{BASE}$ and used to represent each memory function. Thus, rather than storing fifteen duplicate membership function data, only one $D_{BASE}$ need be stored. In addition, position data, referred to as $D_{SUB}$, may be stored to represent the beginning location of each membership function along the abscissa. Thus, and as shown in FIG. 7, for tracking control data $CX1(n-1)$ the membership function PM begins at sample 21 along the abscissa, membership function PS begins at sample 17, membership function ZR begins at sample 13, membership function NS begins at sample 9 and membership function NM begins at sample 5. Consequently, rather than representing each membership function with thirty-two samples, only six samples need be used: five samples representing the membership function data $D_{BASE}$ shown in FIG. 6 and one sample representing the position data $D_{SUB}$ which identifies the coordinate along the abscissa at which the membership function begins.

Since membership functions PM, PS, ZR, NS and NM in each set exhibit substantially the same characteristic relationship, common membership function data $D_{BASE}$ is used to represent all of the membership functions, and each membership function additionally is represented by a unique position data $D_{SUB}$. While the fifteen membership functions may be represented by the five samples comprising common membership function data $D_{BASE}$ and fifteen samples representing the position data for each membership function, the fifteen position data samples needed for all sets may be reduced further to only five samples if a particular membership function in one set is located at the same position along the abscissa as that membership function in the other set. For example, the position data for membership function NM of the set for tracking control data $CX1(n-1)$ may be equal to the position data for the membership function NM of the set for envelope change $\Delta E(n)$. Optimally, one set of samples representing the triangular characteristic relationship of a membership function and five samples representing the position data for each membership function may be used in common for the tracking control data $CX1(n-1)$, the envelope change $\Delta E(n)$ and the tracking adjustment, or acceleration $CX1(n)$.

In accordance with the foregoing, a memory of relatively small capacity may be utilized effectively to store a table which represents the respective sets of membership functions.

Although not utilized by reasoning Rules H1-H9, nevertheless the membership functions PL and NL for each set are stored. These membership functions are used by other reasoning rules, to be described, for inferring the magnitude of the tracking control signal to be applied to the capstan motor. Stated more broadly, these membership functions PL and NL are used to infer the magnitude of the tracking adjustment needed to correct tracking errors.

FIG. 8 illustrates a table for inferring tracking control direction $CX1(n)$ for the different membership functions that may be exhibited by tracking control data $CX1(n-1)$ and envelope changes $\Delta E(n)$ in accordance with reasoning Rules H1-H9. It is appreciated that the reasoning rules exclude certain conditions, such as when $CX1(n-1)=NM$ and $\Delta E(n)=NS$, ZR or PS. Such conditions either cannot occur or are highly unlikely and, if they do in fact occur, the remaining reasoning rules are sufficient to accommodate such conditions. For example, if $CX1(n-1)=NM$ and $\Delta E(n)=NS$, then the reasoning rule for $CX1(n-1)=NM$ and $\Delta E(n)=NM$ plus the reasoning rule for $CX1(n-1)=NS$ and $\Delta E(n)=NS$ are used to infer the proper tracking control direction $CX1(n)$. By limiting the fuzzy inference operation to reasoning Rules H1-H9, the overall arithmetic operation and implementation thereof is greatly simplified.

Control circuit 28 is adapted to infer the tracking control direction by using the "Mamdani" technique. (Examples of this are described in, inter alia, "Process Control Using Fuzzy Logic" Mamdani et al Fuzzy Sets Theory and Applications to Policy Analysis and Information Systems, New York: Plenum, 1989, pages 249-265 and "An Experiment in Linguistic Synthesis with a Fuzzy Logic Controller" Mamdani et al., International Journal Man-Machine Studies, Vol. 7, pages 1-13, 1973). Accordingly, the control circuit normalizes the tracking control data $CX1(n-1)$ derived at the preceding time interval, or sampling time, and also normalizes the envelope change $\Delta E(n)$ detected at the present sampling time; and these normalized variables $CX1(n-1)$ and $\Delta E(n)$ are used to read from the memory those membership functions for $CX1(n-1)$ and $\Delta E(n)$ which are satisfied by these normalized variables. Then, the selected membership functions which are read from the memory are further processed to infer a tracking control direction value. The manner in which membership functions are selected from the memory and then processed will best be appreciated by a numerical example.

Let it be assumed that the tracking control data $CX1(n-1)$ derived during the preceding sample is such that, when normalized, it exhibits a value of 0.45. With reference to FIG. 4, this normalized variable has the value 0.7 in membership function PM and the value 0.2 in membership function PS. Let it be further assumed that the presently sampled envelope level differs from the previous sample by an amount which, when normalized, is equal to $-0.4$. From FIG. 5, this normalized variable has the value 0.6 in membership function NM and the value 0.3 in membership function NS.

Now, in accordance with reasoning Rule H1, and as seen from the table shown in FIG. 8, since the normalized value of $CX1(n-1)$ satisfies membership function PM and since the normalized value of $\Delta E(n)$ satisfies membership function NM, it is inferred that tracking error data $CX1(n)$ is within membership function PM. Control circuit 28 reads from the memory the membership function and position data which represents membership function PM for tracking control data $CX1(n)$. That is, membership function data $D_{BASE}$ and position data $D_{SUB}$ are read to provide a suitable representation of this membership function PM, which may be similar to the membership function PM shown in FIG. 4.

In accordance with the Mamdani method, the membership characteristic PM for tracking control data $CX1(n)$ is limited in its maximum value to the lesser of the membership function values corresponding to normalized $CX1(n-1)$ and normalized $\Delta E(n)$. In the present example, the value of the membership function NM for $\Delta E(n)$ is equal to 0.6 and is less than the value 0.7 of membership function PM for normalized $CX1(n-1)$. Consequently, the maximum value of the membership function PM for $CX1(n)$ is limited to 0.6. Hence, and as shown in FIG. 9, membership function PM for the tracking control direction $CX1(n)$ is truncated, or limited, to a maximum value of 0.6. This limited membership function thus appears trapezoidal in shape.

A similar operation is carried out when applying each of the remaining reasoning rules H2-H9. That is, the membership function for the tracking control direction $CX1(n)$ is inferred from the membership functions for the preceding tracking control data $CX1(n-1)$ and the present envelope change $\Delta E(n)$, and the maximum value of the inferred membership function for the tracking control direction $CX1(n)$ is limited to the smaller of the value of the membership function corresponding to the normalized variable $CX1(n-1)$ or $\Delta E(n)$.

Continuing with the present example, from FIG. 4, it is seen that the normalized value 0.45 for $CX1(n-1)$ has the membership function value 0.2 of membership function PS. From FIG. 5, it is seen that the normalized value 0.4 for $\Delta E(n)$ has the membership function value 0.3 of membership function NS. In accordance with reasoning Rule H3, the tracking control direction $CX1(n)$ is inferred to be within membership function PS. Here too, the membership function PS for tracking control direction $CX1(n)$ is limited, or truncated, by the smaller of the value of membership function PS corresponding to the normalized value of $CX1(n-1)$ and membership function NS corresponding to the normalized value of $\Delta E(n)$. In the present example, the value of membership function PS corresponding to the normalized value of $CX1(n-1)$ is equal to 0.2, which is smaller than the value 0.3 of the membership function NS corresponding to the normalized value of ΔE(n). This smaller value limits the magnitude of membership function PS for tracking control direction CX1(n).

FIG. 9 illustrates the two truncated membership functions PS and PM which contain the tracking control direction CX1(n) inferred by reasoning Rules H1 and H3. The illustrated membership functions which are satisfied by the tracking control direction CX1(n) are subjected to an OR operation, resulting in a membership function characteristic represented by the solid line in FIG. 9. As will be described below, a tracking control direction value may be derived from the membership function characteristic shown in FIG. 9 by determining the center of gravity of that characteristic. It is appreciated that the coordinate of that center of gravity along the abscissa represents the normalized tracking control direction value. As will also be described below, the value of the tracking control magnitude is inferred from the membership function characteristic derived for tracking control direction CX1(n). That is, the membership function characteristic shown in FIG. 9 is used to infer the value of the tracking control magnitude.

It will be appreciated that the foregoing discussion has explained how the value of the direction of tracking control is obtained. The manner in which control circuit 28 derives a value of the tracking control magnitude CX1(n) now will be described.

Control circuit 28 operates in accordance with particular reasoning rules to infer the amount, or magnitude, of tracking control as follows:

Rule RK1: When the signal level E(n) of the detected envelope ENV is small, the amount of tracking adjustment, or tracking control (CX1(n)), such as the amount of acceleration applied to the capstan motor, is substantially zero.

Rule RK2: When the signal level E(n) of the envelope is slightly larger and it has been inferred (from the preceding discussion) that the direction of tracking control is positive (D(n)>0), that is, it has been determined that the capstan motor should be accelerated, a small amount of positive tracking control CX1(n) is provided, that is, the capstan motor is accelerated by a small amount.

Rule RK3: When the signal level E(n) of the envelope is slightly larger, and it has been inferred that tracking control should be applied in the negative direction (D(n)<0), that is, it is determined that the capstan motor should be decelerated, then the magnitude of tracking control CX1(n) is small (i.e. a small amount of deceleration is applied to the capstan motor).

Rule RK4: When the signal level E(n) of the envelope is of an intermediate (or medium) level, and it has been inferred that the tracking control direction is positive (D(n)>0), that is, the capstan motor should be accelerated, then the amount of tracking control CX1(n) to be applied is large, that is, a large amount of acceleration is applied to the capstan motor.

Rule RK5: When the signal level E(n) of the envelope is of an intermediate level and it has been inferred that the tracking control direction is negative (D(n)<0), that is, it is determined that the capstan motor should be decelerated, then the magnitude of the tracking control CX1(n) is large, that is, a large amount of deceleration is applied to the capstan motor.

Rule RK6: When the signal level E(n) of the envelope is large, then the magnitude of the tracking control CX1(n) is large and is applied in the negative direction, that is, a large amount of deceleration is applied to the capstan motor.

Representing the signal level E(n) by the same notations that have been used above to designate substantially zero (ZR), small (PS), intermediate (PM) and large (PL), and representing the positive and negative directions of tracking control as P and N (which correspond to acceleration and deceleration, respectively), then the foregoing reasoning rules may be summarized as follows:

Rule R1
$E(n)=ZR \rightarrow CX1(n)=ZR$
Rule R2
$E(n)=PS$ AND $D(n)=P \rightarrow CX1(n)=PS$
Rule R3
$E(n)=PS$ AND $D(n)=N \rightarrow CX1(n)=NS$
Rule R4
$E(n)=PM$ AND $D(n)=P \rightarrow CX1(n)=PL$
Rule R5
$E(n)=PM$ AND $D(n)=N \rightarrow CX1(n)=NL$
Rule R6
$E(n)=PL \rightarrow CX1(n)=NL$ Rules R1–R6 are summarized in the table illustrated in FIG. 10. For convenience, and to reduce the requisite reasoning rules needed to infer the magnitude of tracking control to correct for large errors, it is assumed that when the level of the detected envelope E(n) is large, a tracking adjustment will be made in the negative direction. That is, CX1(n) is assumed to be a large negative value NL irrespective of the actual direction that may be inferred by the aforementioned Rules H1–H9. Hence, for large tracking errors, tracking correction is achieved by applying a large deceleration to the capstan motor.

FIG. 11 is a graphical representation of the membership functions which may be satisfied by the envelope level E(n). From FIG. 3, it is appreciated that the envelope always is positive and, thus, membership functions NS, NM and NL are not needed to represent the envelope level. Membership function and position data representing the set of membership functions for the envelope level E(n) are stored in the memory in a manner similar to that by which the membership functions discussed above are stored.

Figure 12:
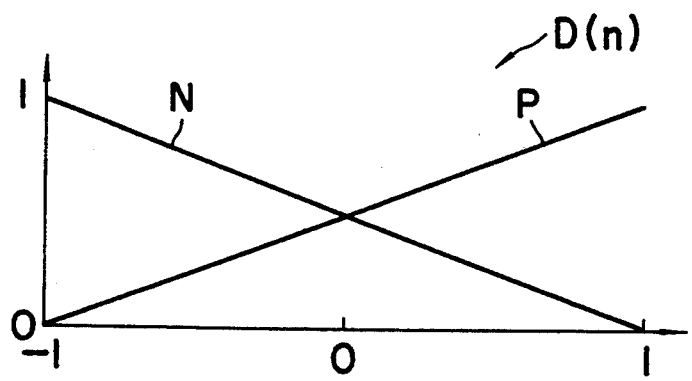
FIG. 12 is a graphical representation of the membership functions for the direction of tracking control derived by the present invention.

FIG. 12 is a graphical representation of the membership functions for the tracking control direction D(n) inferred by reasoning Rules H1–H9. It is appreciated that the tracking control direction is either positive P or negative N. Here too, membership function and position data representing these membership function characteristics are stored in the memory.

Figure 13:
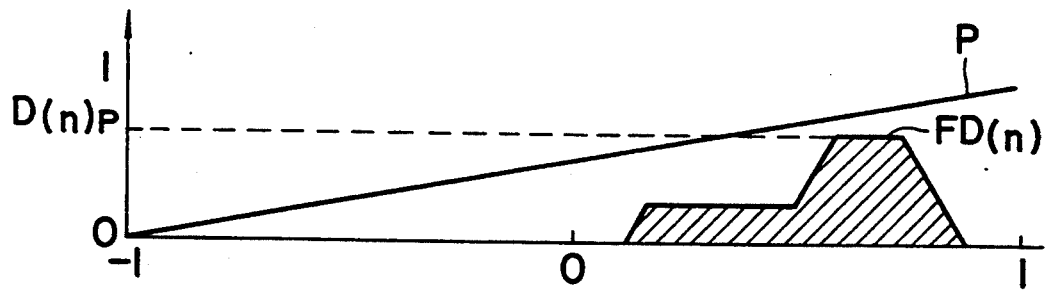
FIGS. 13 and 14 are graphical diagrams which are useful in explaining the manner in which fuzzy inference is used to produce a tracking control direction.
Figure 14:
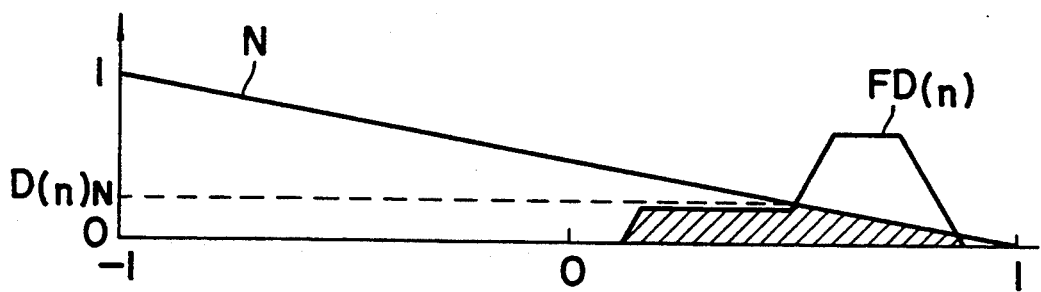

FIGS. 13 and 14 are graphical representations of the relationship between the inferred tracking control direction as determined by reasoning Rules H1–H9 and the membership functions P and N, respectively, of the tracking control direction. The inferred tracking control direction FD(n) is illustrated for the example discussed above in conjunction with FIG. 9. The shaded portions in FIGS. 13 and 14 designate the overlapped portions between the inferred tracking control direction FD(n) and the membership functions P and N for the tracking control direction. These shaded portions represent the maximum values of the control direction and are applied in reasoning Rules R1–R6 to detect the front conditions of those rules. These front conditions are used by control circuit 28 to limit the membership functions for tracking control data CX1(n) inferred by Rules R1-R6 and shown in the table of FIG. 10. That is, these front conditions limit the maximum values of membership functions NL, NS, ZR, PS and PL which are inferred by reasoning Rules R1-R6.

In accordance with the present invention, to reduce the amount of data needed to represent the membership functions for tracking control data CX1(n), the membership functions which are stored in the memory for tracking control data CX1(n−1) are used as the membership functions for the tracking control data CX1(n). In particular, the membership functions NL, NS, ZR, PS and PL for tracking control data CX1(n−1) are the same membership functions NL, NS, ZR, PS and PL for tracking control data CX1(n). By reducing the amount of data needed to be stored in the memory, the overall complexity of the control circuit may be reduced.

When selecting a membership function from the memory for CX1(n) as inferred by Rules R1-R6 based upon the detected envelope level E(n) and the tracking control direction D(n), the maximum value of the selected membership function is limited by the lesser of the value of the membership function corresponding to E(n) and the membership function corresponding to D(n) in a manner similar to that discussed above in conjunction with FIG. 9. Thus, for reasoning Rule R1, the membership function ZR for tracking control data CX1(n) is limited by the value of the membership function ZR corresponding to the envelope signal level E(n).

Similarly, for reasoning Rule R2, the maximum value of membership function PS read from the memory for tracking control data CX1(n) is limited by the lesser of the value of the membership function PS corresponding to the detected envelope level E(n) and the value of the membership function P corresponding to the inferred tracking control direction D(n). A similar limitation in the maximum value of the membership function for tracking control data CX1(n) which is inferred by Rules R3-R6 is effected as a function of the lesser of the value of the membership function corresponding to the detected envelope level E(n) and the value of the membership function corresponding to the inferred tracking control direction D(n). Of course, the membership function NL for tracking control data CX1(n) of Rule R6 is limited by the value of the membership function PL corresponding to the detected envelope level.

FIG. 15 is a graphical representation of the inferred tracking control magnitude in accordance with the following example: it is assumed that D(n)=P and that the detected envelope level E(n) is normalized as Ea, shown in FIG. 11. Accordingly, the envelope level Ea has a corresponding value b in membership function PS and a corresponding value a in membership function ZR. From rule R1, the tracking control data CX1(n) is inferred to be in membership function ZR; and from the Mamdani technique, this membership function ZR is limited, or truncated to the value a. This limitation in the membership function ZR for CX1(n) is shown in FIG. 15. Likewise, for rule R2, the tracking control data CX1(n) is inferred to be in membership function PS; and from the Mamdani technique, this membership function PS is limited to the value b as shown in FIG. 15. As before, these two membership functions ZR and PS for tracking control data CX1(n) are subjected to an OR operation, illustrated by the solid line in FIG. 15.

It will be appreciated that, by using fuzzy inference to obtain tracking control data, accurate tracking control is attained even if the signal $S_{RF}$ reproduced from the record medium varies in signal level. Furthermore, even the non-linear changes in the reproduced signal level have little affect upon the tracking control derived by the use of fuzzy inference discussed above. Hence, both transient and steady-state tracking control characteristics are improved over the prior art. Although some prior art proposals contemplate the use of simulating the playback and tracking apparatus with a computer model, the fact that the reproduced signal $S_{RF}$ varies non-linearly makes it difficult to provide such a simulated model. Whereas the prior art model simulation approach thus may not provide precise tracking control, errors due to such non-linearity in the reproduced signal are avoided by the fuzzy inference technique of the present invention.

The manner in which a tracking control signal is produced from the membership functions of the tracking control data produced by the fuzzy inference technique of the present invention now will be described. For simplification, it is assumed that the tracking control data membership function is of the type illustrated in FIG. 15. It will, nevertheless, be appreciated that other membership function characteristics will be inferred for different levels of the reproduced signal envelope and for different changes in that envelope. The processor included in control circuit 28 is programmed to carry out the routine shown in FIG. 16 which functions to detect the center of gravity of the membership function characteristic which has been inferred for the tracking control data CX1(n).

Assuming that the membership function illustrated in FIG. 15 represents the tracking control data inferred by reasoning Rules H1-H9 and R1-R6, this membership function characteristic is sampled by providing, for example, thirty-two samples along the abscissa from −1 to +1. The value of each sample represents the membership function characteristic of the tracking control data CX1(n), and it is appreciated that the maximum value of the membership function characteristic at any sampling point is no greater than 1. Each of the thirty-two sampling points may be represented by a 5-bit address. Accordingly, since membership function ZR (in FIG. 15) begins at sampling point 13 (as discussed above in conjunction with FIG. 7), it is appreciated that, for the first twelve sampling points, or addresses, membership function data equal to 0 is stored.

FIG. 17A illustrates eight sampling points (0-8) of the membership function characteristic shown in FIG. 15. FIG. 17B represents the value of the membership function characteristic at each sampling point and, for a purpose soon to be explained, each sampling point in FIG. 17A is associated with a corresponding address (such as address 1, 2, ... 6 ... etc.). Referring to the flow chart shown in FIG. 16, the manner in which the control circuit carries out the illustrated routine to determine the center of gravity of the membership function characteristic now will be discussed.

After starting the routine at instruction SP1, the control circuit cumulatively adds the value at each sampling point to the summation of the values obtained at the preceding sampling points, as represented by instruction SP2. FIG. 17C represents the cumulative addition from sampling point to sampling point, with each cumulative sum being stored at a corresponding address. Thus, the value of the membership function characteristic at sampling point 1 is added to the value of the membership function characteristic at sampling point 0 and is stored in address 1 corresponding to sampling point 1. Then, the value of the membership function at sampling point 2 is added to the previous accumulated sum stored at address 1, and this cumulative sum is stored in address 2 corresponding to sampling point 2. This process repeats until the cumulative sum of the values of the membership function characteristic at all of the sampling points is stored in address 7 corresponding to sampling point 7.

The control circuit then advances to instruction SP3 which divides the cumulative sum in address 7 by the factor 2. In the example shown in FIG. 17, the cumulative sum 2.5 is divided by 2, resulting in the quotient 1.25. Then, control circuit 28 advances to instruction SP4 to determine the address at which the cumulative sum closest to this quotient (1.25) is stored. From FIG. 17, it is seen that the cumulative sum of 1.1 is stored in address 4, and this is closer to the quotient 1.25 than the cumulative sum 1.8 (stored in address 5) or 0.8 (stored in address 3). Address 4 is referred to as the "gravity center near data" and represents the address closest to the center of gravity of the illustrated membership function characteristic.

Next, the control circuit advances to instruction SP5 to determine the address adjacent address 4 which stores the cumulative sum that is close to the quotient 1.25. From FIG. 17, it is seen that address 5 corresponds to this requirement and is referred to as an "adjacent data address". Then, the center of gravity is detected by interpolating the address between addresses 4 and 5 that correspond to the address at which the quotient 1.25 would have been stored. This interpolation is obtained in accordance with the following equation:

$$(1.25-1.1)/(1.8-1.1)=0.21 \quad (2)$$

The resultant, interpolated value 0.21 is added to address 4 (i.e. it is added to the "gravity center near data") resulting in a sampling point, or address, at the center of gravity of 4.21. It is this interpolated center of gravity address that is used as the tracking control signal.

It is appreciated that the center of gravity of the membership function characteristic is determined with high accuracy without requiring the use of a large number of samples to represent the membership functions. That is, high accuracy is achieved with low membership function resolution. This center of gravity then is normalized and supplied by control circuit 28 to D/A converter 38 for selectively accelerating or decelerating capstan motor 9 of FIG. 2.

It will be appreciated that instruction SP3 for dividing the cumulative sum by the factor 2 may be achieved simply by shifting the digital value of the cumulative sum by one bit. That is, this division may be achieved by deleting the least significant bit from the cumulative sum. Hence, the overall arithmetic operation relied upon to derive the tracking control data from the membership function characteristic CX1(n) is relatively simple, and employs simple division and addition. Locating the center of gravity of a function may be defined by the following equation:

$$W = \frac{\sum_{i=0}^{n} \{(\text{weight}) \times (\text{distance})\}}{\sum_{i=0}^{n} (\text{weight})} \quad (3)$$

If equation (3) is followed precisely, the overall arithmetic operations needed to implement this equation (assuming the use of thirty-two samples to represent a membership function characteristic) consists of thirty-two multiplication operations, sixty-four addition operations and one division operation. However, by relying upon the routine illustrated in FIG. 16, the center of gravity may be detected accurately and easily without requiring several repeated operations. That is, the routine illustrated in FIG. 16 which detects the center of gravity is far simpler than the mathematical routine needed to implement equation (3).

In actual control over capstan motor 9 (FIG. 2), the tracking control signal derived from the center of gravity of the membership function characteristic produced by the fuzzy inference technique discussed above is combined with the capstan speed control signal normally produced by the control circuit; and the combined signal is applied as a capstan control signal to the capstan motor. Thus, the capstan is driven at a controlled, predetermined speed with selective acceleration and deceleration to provide proper tracking control such that heads 2, 3 precisely scan the slant tracks recorded on tape 12.

To summarize the manner in which the present invention provides fuzzy tracking control, the envelope ENV of the signal $S_{RF}$ reproduced from tape 12 by heads 2, 3 is detected in envelope detector 30; and the detected envelope level is supplied to control circuit 28. Changes $\Delta E(n)$ in the envelope are obtained, and these envelope changes $\Delta E(n)$ together with the previous tracking control data (or tracking adjustment) CX1(n−1) are subjected to fuzzy inference in accordance with Rules H1–H9. Thus, the tracking control direction is inferred by the reasoning rules. Then, the inferred tracking control direction together with the detected envelope signal level E(n) are subjected to fuzzy inference in accordance with reasoning Rules R1–R6 to produce the tracking control magnitude value. The resulting tracking control data is expressed as a membership function characteristic whose center of gravity is determined and, when normalized, is applied to capstan motor 9 to correct for tracking errors. That is, the capstan motor is accelerated or decelerated in a manner which brings heads 2, 3 into proper alignment with the slant tracks recorded on tape 12.

By utilizing fuzzy inference, a correct tracking control operation is effected even if the level of the signal $S_{RF}$ reproduced from tape 12 changes. Moreover, the non-linear relationship between the level of the reproduced signal and the tracking error does not adversely affect the tracking control data produced by the fuzzy inference of the present invention. Moreover, the present invention exhibits significant simplification because the data which must be stored to represent the various membership functions discussed above can be minimized, whereby membership function data $D_{BASE}$ and position data $D_{BASE}$ may be used to represent all membership functions. This reduces the capacity of the memory needed to store the membership functions and, as a result, simplifies the overall tracking control circuit.

Still further, the present invention relies upon a relatively simple technique to determine the center of gravity of the membership function characteristic representative of the tracking control data. This simplified implementation nevertheless produces highly accurate tracking control while minimizing the resolution needed to represent the membership functions.

While the present invention has been particularly shown and described with reference to preferred embodiments, it will be readily appreciated by those of ordinary skill in the art that various changes and modifications may be made without departing from the spirit and scope of the invention. For example, tracking control has been described in the context of selectively accelerating or decelerating the capstan motor. Alternatively, tracking control may be achieved by automatic track following, such as by using the relative amplitudes of recorded pilot signals as tracking error indications. Furthermore, for purposes of simplification, equation (1) above is implemented by setting coefficients $B_i$ and C equal to zero. If desired, equation (1) may be implemented in its entirety. Still further, although the Mamdani inference technique is preferred, the present invention is not limited solely to that technique. It is appreciated that other methods of inferring membership function characteristics may be adopted.

It also is noted that, although the present invention has been described in the environment of a video tape recorder, this invention finds ready application to other environments in which tracking control normally is carried out. For example, tracking control in digital audio tape (DAT) recorders, optical disk devices, hard disk drives, and the like, may be effected by the present invention.

Still further, although common membership function data $D_{BASE}$ has been described above as being representative of the various membership functions shown in, for example, FIGS. 4, 5 and 11, each set of membership functions may be represented by membership function data common to that set alone.

It is intended that the appended claims be interpreted as covering the specific embodiments discussed above, the aforementioned alternatives and applications and all equivalents thereto.

What is claimed is:

1. A method of controlling a tracking of a head relative to a medium from which signals are played back comprising a steps of: detecting a signal level of signals which are played back; generating present tracking control direction and magnitude values as a function of the detected signal level by providing a first set of membership functions representing respective degrees to which changes in the detected signal level satisfy predetermined ranges of change, providing a second set of membership functions representing respective degrees to which previous tracking control direction and magnitude adjustments satisfy predetermined ranges of adjustment, determining particular membership functions from said first and second sets corresponding to a detected signal level change and to a preceding tracking control direction and magnitude adjustment, and inferring said present tracking control direction and magnitude values from the determined membership functions; and adjusting the tracking of said head in response to the present tracking control value.

2. The method of claim 1 wherein at least one of the steps of providing a set of membership functions comprises storing membership function data representing a characteristic relationship between a variable (signal level change or previous tracking adjustment) and its degree of satisfaction, said membership function data being common to plural membership functions in said set, and storing position data identifying a respective position of each of said plural membership functions in said set.

3. The method of claim 2 wherein said variable is normalized, and wherein said position data represents coordinates along an abscissa at which the respective membership functions in said set begin.

4. The method of claim 1 wherein said step of inferring tracking control comprises providing a third set of tracking control membership functions representing degrees to which tracking control values satisfy predetermined ranges of values, selecting from the third set at least one tracking control membership function in response to the membership functions determined from said first and second sets and in accordance with predetermined reasoning rules, and deriving the tracking control from the selected tracking control membership function.

5. The method of claim 4 wherein the derived tracking control represents the tracking control direction value; and further comprising the steps of providing an additional set of membership functions representing respective degrees to which the detected signal level satisfies predetermined ranges of signal levels; selecting at least one membership function from said additional set corresponding to said detected signal level; and using specific reasoning rules to infer the tracking control magnitude value from the membership functions selected from said additional set and from the derived tracking control direction value.

6. The method of claim 5 wherein the step of using specific reasoning rules to infer the tracking control magnitude value includes selecting at least one tracking control membership function from said third set in accordance with said specific reasoning rules, and modifying a last-mentioned selected tracking control membership function in response to a lesser of the membership function selected from said additional set and the derived tracking control direction value.

7. The method of claim 6 wherein said step of adjusting the tracking of said head in response to said tracking control data comprises determining a substantial center of gravity of the modified tracking control membership function, and generating an adjustment signal in response to the determined center of gravity.

8. A method of controlling a tracking of a head relative to a medium from which signals are played back comprising the steps of: detecting a signal level of signals which are played back; generating tracking control data as a function of the detected signal level by providing first ($\Delta E$), second ($E(n)$) and third ($CX1(n-1)$) sets of membership functions respectively representing a degree to which a change in the detected signal level ($\Delta E$), the degree to which the level of the detected signal ($E(n)$) and the degree to which a preceding tracking adjustment ($CX1(n-1)$) satisfy predetermined ranges of values, selecting at least one membership function from said first, second and third sets in response to a determined change in the detected signal level and the level of the detected signal and in accordance with specific reasoning rules, determining a center of gravity of the at least one membership function selected from said third set, and generating a tracking control signal in response to the determined center of gravity; and adjusting the tracking of said head in response to said tracking control data.

9. The method of claim 8 wherein said preceding tracking adjustment (CX1(n−1)) represents a direction and magnitude of tracking adjustment; and wherein said step of selecting at least one membership function from said first, second and third sets includes selecting those membership functions from said first set (ΔE) which are satisfied by the degree of change in the detected signal level (ΔE), selecting those membership functions from said third set (CX1(n−1)) which are satisfied by the degree of a preceding tracking adjustment (CX1(n−1)), pairing the membership functions selected from said first set with the membership functions selected from said third set in accordance with said specific reasoning rules, limiting a value of a larger one of paired membership functions with the degree of satisfaction exhibited by a smaller one of the paired membership functions, and combining the limited membership functions in all pairs to produce an inferred tracking control direction characteristic.

10. The method of claim 9 wherein said step of selecting at least one membership function from said first, second and third sets further includes selecting those membership functions from said second set (E(n)) which are satisfied by the level of the detected signal (E(n)), selecting those membership functions from said third set (CX1(n−1)) in response to the membership functions selected from said second set and the inferred tracking control direction pursuant to said specific reasoning rules, and selectively limiting the values of the membership functions selected from said third set as a function of the degree of satisfaction exhibited by the membership function selected from said second set or the degree of inferred tracking control direction.

11. Apparatus for controlling a tracking of a head relative to a medium from which signals are played back comprising level detecting means for detecting a signal level of signals which are played back; fuzzy control means responsive to the detected signal level for generating present tracking control direction and magnitude values to adjust the tracking of the head, said fuzzy control means comprising memory means for storing a first set of membership functions representing respective degrees to which changes in the detected signal level satisfy predetermined ranges of change and a second set of membership functions representing respective degrees to which previous tracking control direction and magnitude adjustments satisfy predetermined ranges of adjustment, and processor means programmed to retrieve from said memory means membership functions from said first and second sets corresponding to a detected signal level change and to a preceding tracking control direction and magnitude adjustment, and to infer said present tracking control direction and magnitude values from the retrieved membership functions; and adjustment means for adjusting the tracking of said head in response to the present tracking control value.

12. The apparatus of claim 11 wherein said memory means stores membership function data representing a characteristic relationship between a variable (signal level change or previous tracking adjustment) and its degree of satisfaction, said membership function data being common to plural membership functions in said set, and position data identifying a respective position of each of said plural membership functions in said set.

13. The apparatus of claim 12 wherein said variable is normalized, and wherein said position data represents coordinates along an abscissa at which the respective membership functions in said set begin.

14. The apparatus of claim 11 wherein said memory means stores a third set of tracking control membership functions representing degrees to which tracking control values satisfy predetermined ranges of values; and wherein said processor means is further programmed to retrieve from said memory means at least one tracking control membership function from the third set in response to the membership functions retrieved from said first and second sets and in accordance with predetermined reasoning rules, and to derive the tracking control from the tracking control membership function retrieved from said third set.

15. The apparatus of claim 14 wherein the derived tracking control represents the tracking control direction value; wherein said memory means stores an additional set of membership functions representing respective degrees to which the detected signal level satisfies predetermined ranges of signal levels; and wherein said processor means is additionally programmed to retrieve from said memory means at least one additional set corresponding to said detected signal level, and to use specific reasoning rules to infer the tracking control magnitude value from the membership functions retrieved from said additional set and from the derived tracing control direction value.

16. The apparatus of claim 15 wherein said processor means is programmed to use specific reasoning rules to infer the tracking control magnitude value by retrieving from said memory means at least one tracking control membership function from said third set in accordance with said specific reasoning rules, and to modify a last-mentioned retrieved tracking control membership function in response to a lesser of the membership function retrieved from the additional set and the derived tracking control direction value.

17. The apparatus of claim 16 wherein said adjustment means includes means for determining a substantial center of gravity of the modified tracking control membership function, and means for generating an adjustment signal in response to the determining means.

18. Apparatus for controlling a tracking of a playback head relative to a medium from which signals are played back comprising: level detecting means for detecting a signal level of signals which are played back; fuzzy control means responsive to the detected signal level for generating tracking control data to adjust the tracking of the head, said fuzzy control means comprising memory means for storing first (ΔE), second (E(n)) and third (CX1(n−1)) sets of membership functions respectively representing a degree to which a change in the detected signal level (ΔE), the degree to which the level of the detected signal (E(n)) and the degree to which a preceding tracking adjustment (CX1(n−1)) satisfy predetermined ranges of values, and processor means programmed to select at least one membership function from said first, second and third sets as a function of a determined change in the detected signal level and the level of the detected signal, and in accordance with specific reasoning rules, to determine a center of gravity of at least one membership function selected from said third set, and to generate a tracking control signal in response to the determined center of gravity; and adjustment means for adjusting the tracking of said head in response to said tracking control data.

19. The apparatus of claim 18 wherein said preceding tracking adjustment (CX1(n−1)) represents a direction and magnitude of tracking adjustment; and wherein said processor means is further programmed to select those membership functions from said first set (ΔE) which are satisfied by the degree of change in the detected signal level (ΔE), to select those membership functions from said third set (CX1(n−1)) which are satisfied by the degree of preceding tracking adjustment. (CX1(n−1)), to pair the membership functions selected from said first set with the membership functions selected from said third set in accordance with said specific reasoning rules, to limit a value of a larger one of the paired membership functions with the degree of satisfaction exhibited by a smaller of the paired membership functions, and to combine the limited membership functions in all pairs to produce an inferred tracking control direction characteristic.

20. The apparatus of claim 19 wherein said processor means is additionally programmed to select those membership functions from said second set (E(n)) which are satisfied by the level of the detected signal (E(n)), to select those membership functions from said third set (CX1(n−1)) in response to the membership functions selected from said second set and the inferred tracking control direction pursuant to said specific reasoning rules, and to selectively limit the values of the membership functions selected from said third set as a function of the degree of satisfaction exhibited by the membership function selected form said second set or the degree of inferred tracking control direction.

* * * * *